United States Patent [19]

Yazdy

[11] Patent Number: 5,708,783
[45] Date of Patent: Jan. 13, 1998

[54] DATA BUS ARBITER FOR PIPELINED TRANSACTIONS ON A SPLIT BUS

[75] Inventor: Farid A. Yazdy, Belmont, Calif.

[73] Assignee: Apple Computer, Inc., Cupertino, Calif.

[21] Appl. No.: 430,454

[22] Filed: Apr. 28, 1995

[51] Int. Cl.⁶ ............................................. G06F 13/362
[52] U.S. Cl. ............................................. 395/293
[58] Field of Search ........................... 395/293–298, 395/728–729

[56] References Cited

U.S. PATENT DOCUMENTS

| | | | |
|---|---|---|---|
| 4,473,880 | 9/1984 | Budde et al. | 395/292 |
| 4,547,845 | 10/1985 | Ross | 364/200 |
| 4,682,284 | 7/1987 | Schrofer | 395/875 |
| 4,817,037 | 3/1989 | Hoffman et al. | 364/200 |
| 4,896,256 | 1/1990 | Roberts | 364/200 |
| 5,067,071 | 11/1991 | Schanin et al. | 395/293 |
| 5,073,851 | 12/1991 | Masterson et al. | 395/425 |
| 5,191,649 | 3/1993 | Cadambi et al. | 395/200.05 |
| 5,237,567 | 8/1993 | Nay et al. | 370/85.1 |
| 5,289,585 | 2/1994 | Kock et al. | 395/293 |
| 5,347,648 | 9/1994 | Stamm et al. | 395/575 |
| 5,353,429 | 10/1994 | Fitch | 395/425 |
| 5,355,467 | 10/1994 | MacWilliams et al. | 395/425 |
| 5,367,678 | 11/1994 | Lee et al. | 395/650 |
| 5,375,215 | 12/1994 | Hanawa et al. | 395/425 |
| 5,377,324 | 12/1994 | Kabemoto et al. | 395/200 |
| 5,416,910 | 5/1995 | Moyer et al. | 395/293 |
| 5,485,586 | 1/1996 | Brash et al. | 395/292 |

OTHER PUBLICATIONS

*PowerPC™ 601, RISC Microprocessor User's Manual*, Motorola Inc. 1993, pp. 6-16—6-17; 9-1—9-12; and 9-18—9-19.

*Primary Examiner*—Gopal C. Ray
*Assistant Examiner*—Sumati Lefkowitz
*Attorney, Agent, or Firm*—Burns, Doane, Swecker & Mathis, L.L.P.

[57] ABSTRACT

A data bus arbiter for supporting pipelined transactions employs a circular FIFO for storing bus requests. The arbiter includes two pointers which reference the entries of the FIFO. A first pointer is incremented upon detection of the end of a bus cycle. A second pointer is incremented when a new bus cycle is started.

9 Claims, 4 Drawing Sheets

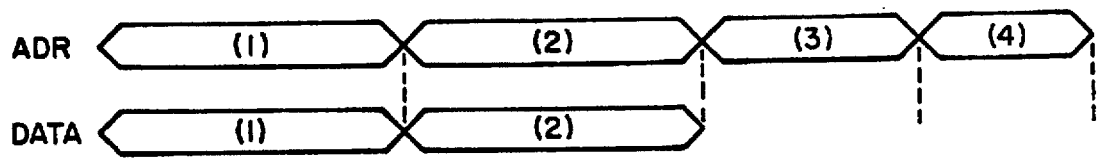
FIG_1
*(PRIOR ART)*
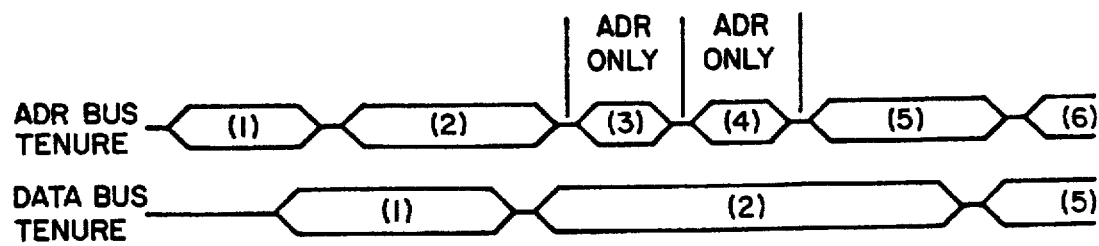
FIG_2
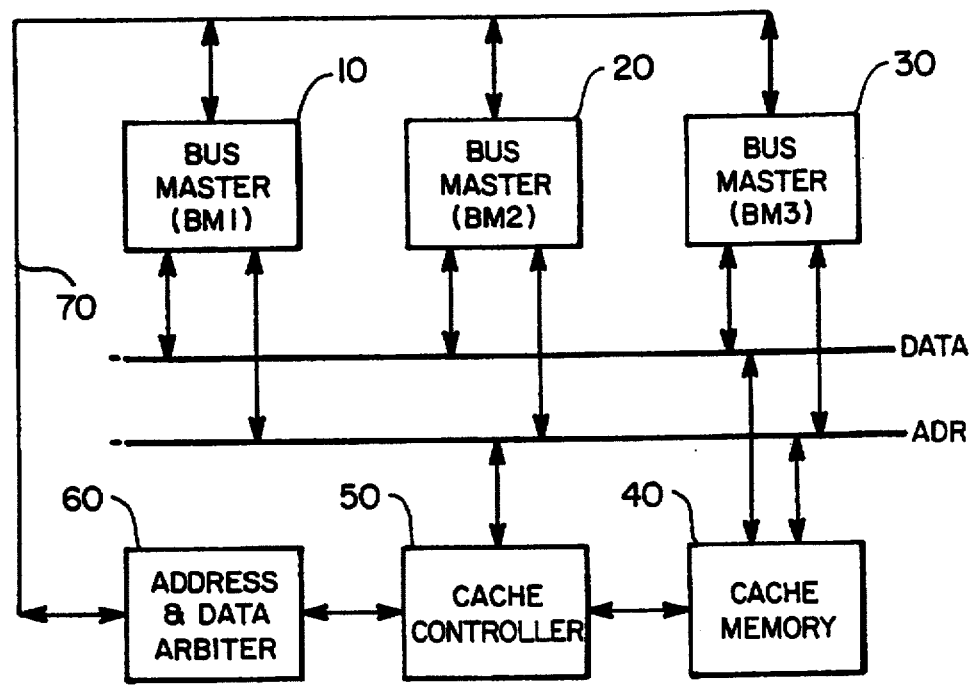
FIG_3

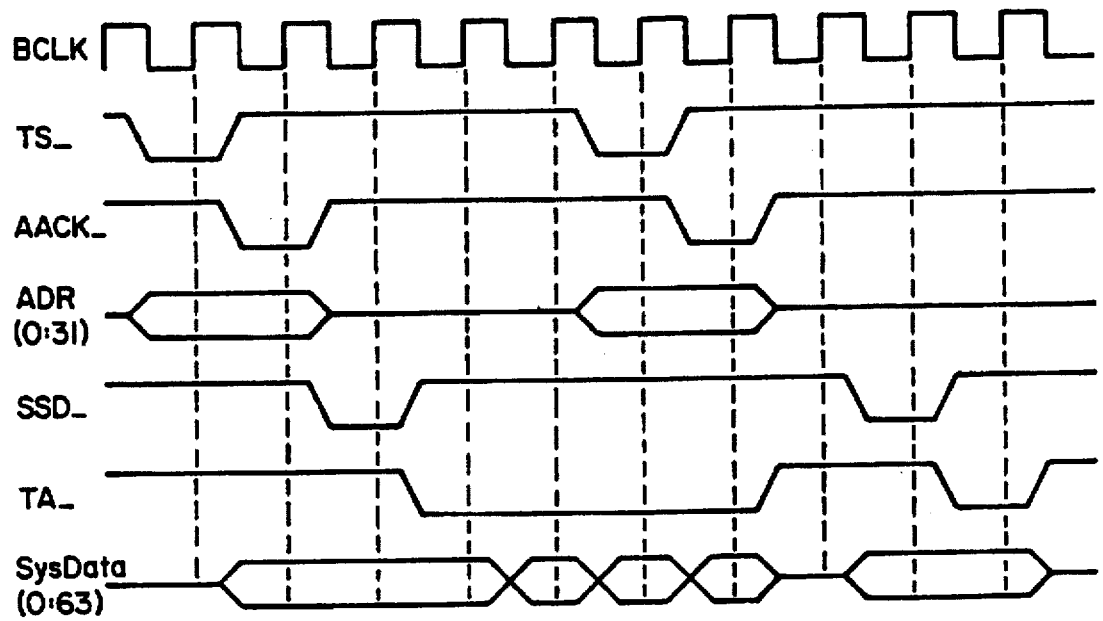
FIG_4A
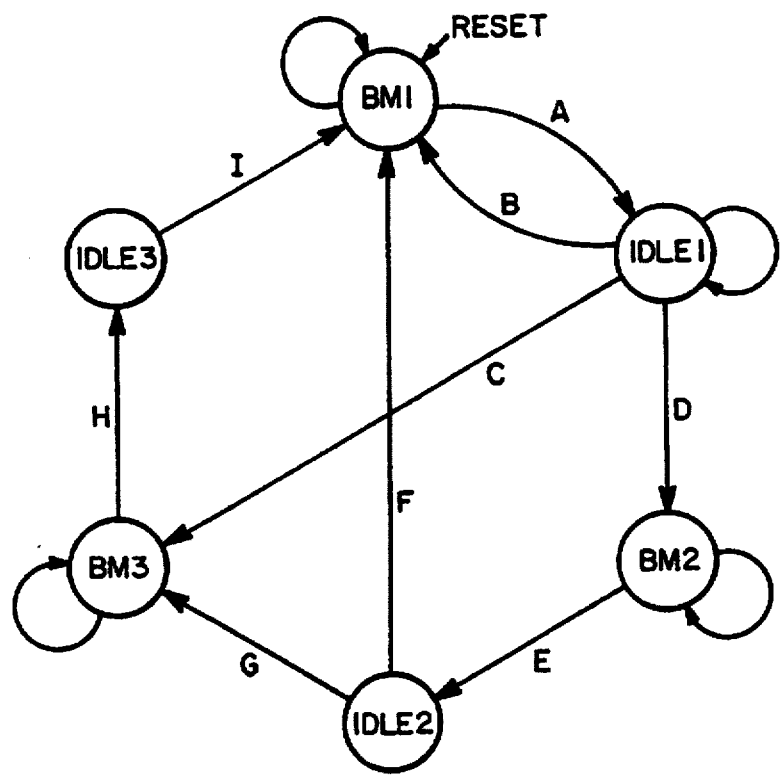
FIG_4B

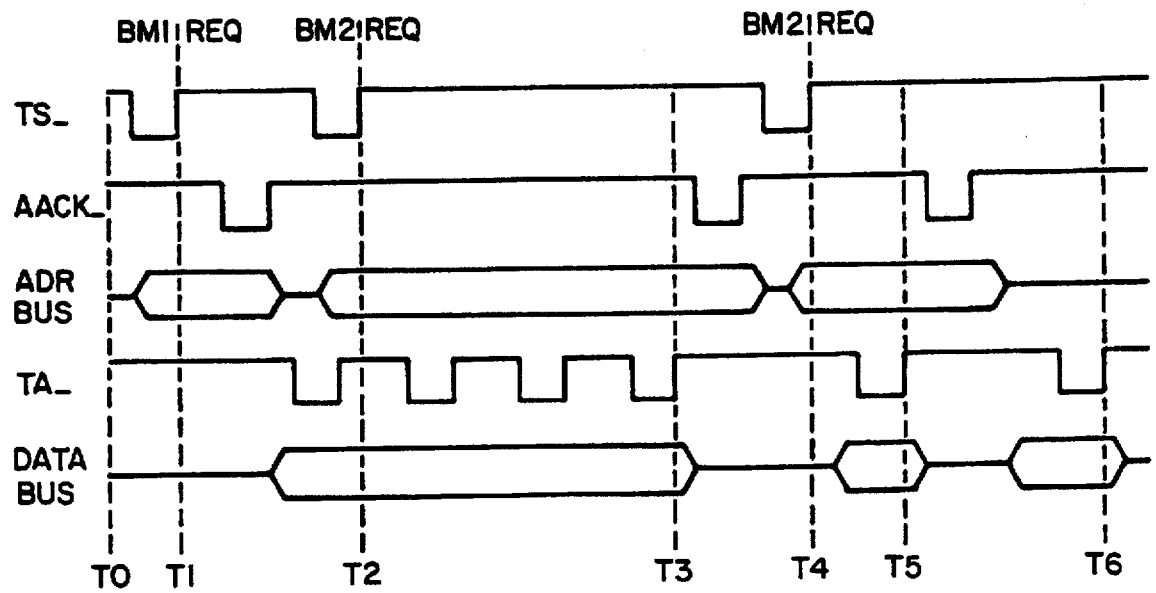
FIG_5
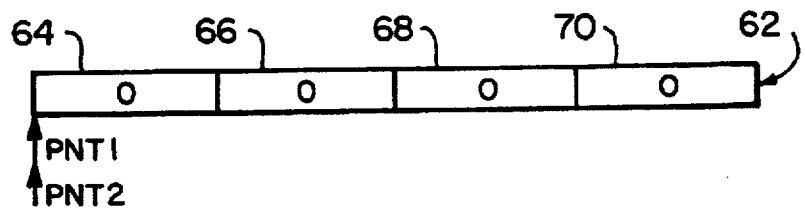
FIG_6a
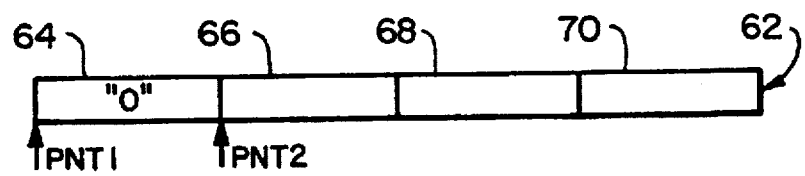
FIG_6b

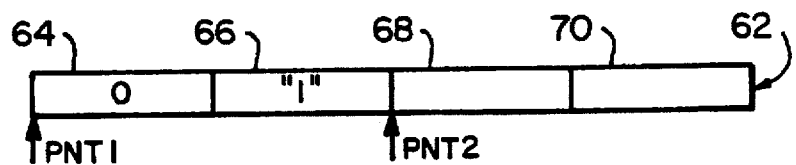
FIG_6c
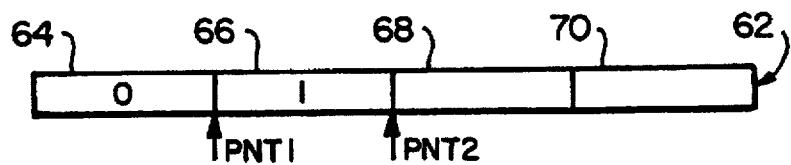
FIG_6d
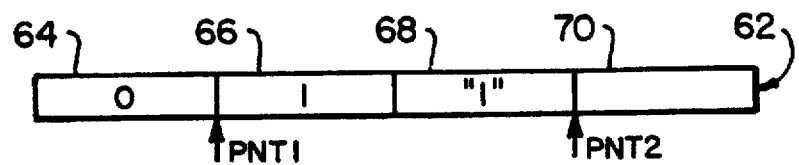
FIG_6e
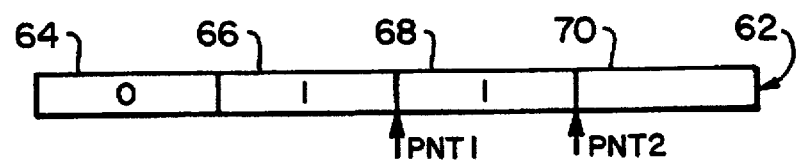
FIG_6f
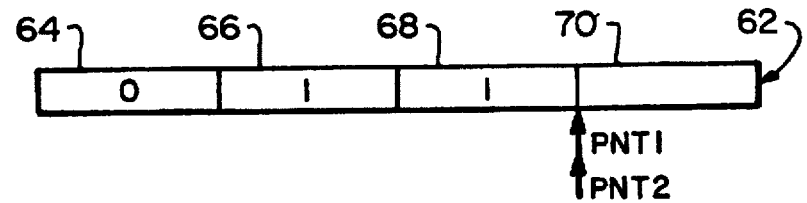
FIG_6g

DATA BUS ARBITER FOR PIPELINED TRANSACTIONS ON A SPLIT BUS

RELATED APPLICATIONS

This application is related to U.S. patent application Ser. No. 08/430,450 to Farid A. Yazdy, entitled "Address Tenure Control for Cache Management", to U.S. patent application Ser. No. 08/430,450, entitled "Address Bus Arbiter for Pipelined Transactions on a Split Bus", and to U.S. patent application Ser. No. 08/430,451, entitled "Address and Data Bus Arbiter for Pipelined Transactions on a Split Bus", each of which was filed on an even date herewith and all of which disclosures are incorporated here by reference.

BACKGROUND

The present invention relates generally to digital computers and, more specifically, to bus arbitration in digital computers.

As the performance demands on digital computers continue to increase at a meteoric pace, processors have been developed which operate at higher and higher clock speeds. The instruction sets used to control these processors have been pard down (e.g., RISC architecture) to make them more efficient. Processor improvements alone, however, are insufficient to provide the greater bandwidth required by computer users. The other computer subsystems which support the processor, e.g., I/O devices and memory devices, must also be designed to operate at higher speeds and support greater bandwidth. In addition to improved performance, cost has always been an issue with computer users. Thus, system designers are faced with the dual challenges of improving performance while remaining competitive on a cost basis.

Buses convey data and instructions between the elements of a digital computer. Commonly, three types or portions of buses are provided, i.e., control, address and data, each of which convey the different types of information connoted by their names. Local buses provide data transmission capability within a device, whereas system buses interconnect devices, such as I/O subsystems, memory subsystems and a central processor, together. In many systems, several devices compete for use of the system bus. In industry parlance, devices which can control the system bus are termed bus masters, while other devices, which are passive and respond to requests from the bus masters, are termed slaves. Some devices may operate at different times either as a slave or a bus master to accomplish different objectives.

In order to avoid bus contention, the situation where two bus masters have simultaneous control over the system bus, a bus arbiter can be provided to prioritize requests to use the bus. In such systems, a device which wishes to become a bus master will send a bus request signal to the arbiter over a dedicated line in the control bus. If the arbiter grants the bus request, then an acknowledgement or granting signal is transmitted back to the requesting device over another control line. The methodology by which the arbiter prioritizes requests is called the bus protocol. These protocols can be implemented as an ordered list of bus masters (i.e., the highest requesting bus master on the list receives a bus grant) or as state machines inside the arbiter.

In many conventional systems, the time periods during which a bus master controls the address bus (address tenure) and the data bus (data tenure) are the same. This concept is illustrated in FIG. 1 wherein the address tenures for memory cycles 1 and 2 are the same as the data tenures for those cycles. Cycles 3 and 4 are "address-only" cycles which are used by the system for operations which require address information but no other data. Since the address and data tenures are synchronized in these conventional systems, a joint arbiter suffices for these systems since only one transaction occurs at a time.

If the address was not continuously driven until the end of the data tenure, it would then be possible to begin another cycle, for example an "address-only" cycle which uses the address bus but not the data bus, while a previously initiated data cycle was being completed on the data bus. This type of overlapping address and data tenure (not shown in FIG. 1) is referred to as pipelining and can improve bus throughput. However, arbitration becomes correspondingly more complex when using pipelining, since arbitration of the data bus and the address bus can now differ. Moreover, if a split bus technology is used, different bus masters can use the address and data buses at the same time which further complicates arbitration issues.

SUMMARY

According to the present invention, a data arbiter can be provided in which plural data bus masters are monitored in a system having one or more levels of pipelining. According to exemplary embodiments, a circular FIFO can be used in conjunction with a pair of pointers for tracking these bus masters and granting the data bus to a waiting bus master after a current bus master has completed its data cycle.

BRIEF DESCRIPTION OF THE DRAWINGS

The foregoing, and other, objects, features and advantages of the present invention will be more readily understood upon reading the following detailed description in conjunction with the drawings in which:

FIG. 1 illustrates conventional address and data tenures;

FIG. 2 illustrates address and data bus tenures according to an exemplary embodiment of the present invention;

FIG. 3 is a block diagram representation of portions of an exemplary processing system according to the present invention;

FIG. 4(A) is a timing diagram used to describe an exemplary idle state case for address arbiters according to the present invention;

FIG. 4(B) is a state diagram illustrating logic for implementing an address arbiter according to an exemplary embodiment of the present invention;

FIG. 5 is an exemplary timing diagram used to illustrate operation of a data arbiter according to the present invention;

FIG. 6(a) illustrates the contents of an exemplary FIFO data arbiter implementation at time T0 in FIG. 5;

FIG. 6(a) illustrates the contents of an exemplary FIFO data arbiter implementation at time T1 in FIG. 5;

FIG. 6(c) illustrates the contents of an exemplary FIFO data arbiter implementation at time T2 in FIG. 5;

FIG. 6(d) illustrates the contents of an exemplary FIFO data arbiter implementation at time T3 in FIG. 5;

FIG. 6(e) illustrates the contents of an exemplary FIFO data arbiter implementation at time T4 in FIG. 5;

FIG. 6(f) illustrates the contents of an exemplary FIFO data arbiter implementation at time T5 in FIG. 5; and FIG. 6(g) illustrates the contents of an exemplary FIFO data arbiter implementation at time T6 in FIG. 5.

DETAILED DESCRIPTION

An exemplary embodiment of the present invention will now be described beginning with reference to FIG. 2. This timing diagram illustrates one level of address pipelining and data bus tenures which are ordered with respect to the address tenures, that is the data tenure associated with address cycle (1) precedes that associated with address cycle (2), etc.

Therein, cycle (1) begins with an address being asserted on the address bus. While that address is being asserted, corresponding data (1) is placed on the data bus. Subsequently, cycle (2) begins with another address being asserted on the address bus. Until the first memory cycle has been completed (illustrated in FIG. 2 as the completion of the first data bus tenure), the address tenure (2) of the second memory cycle continues. This enables the system to preserve the second cycle's address to support the one level of pipelining. Address-only cycles (3) and (4) are pipelined and completed and the address tenure of cycle (5) is allowed to start without waiting for data tenure associated with cycle (2) to finish. However, since cycle (5) is not an address-only cycle, the bus master asserting the address for cycle (5) has to wait until the data tenure from cycle (2) is completed before acknowledging cycle (5) and allowing the next address tenure from cycle (6) to start.

FIG. 3 illustrates an exemplary portion of a processing system which will be used to describe exemplary embodiments of the present invention. Therein, three bus masters 10, 20 and 30 are bidirectionally coupled to address and data buses, respectively. Typically, a control bus would also interconnect these three bus masters, however only the portion of the control bus related to arbitration is illustrated for clarity of the figure. Moreover, those skilled in the art will recognize that the number of bus masters which share resources of the system can be more or fewer than three, which number has simply been chosen to illustrate various aspects of arbitration according to the present invention.

These shared resources may include, for example, a cache memory 40 controlled by a cache controller 50. The arbitration logic for prioritizing usage of the address and data buses is referred to in FIG. 3 by way of block 60. Although not illustrated in FIG. 3, the arbitration bus 70 can include, for example, two or three dedicated lines for each of the bus masters 10, 20 and 30 to provide request, grant and, in the case of a three line arbitration bus, acknowledge capability to the arbiter 60. Those skilled in the art will also recognize that the configuration illustrated in FIG. 3 is one of many in which the present invention can be implemented. Having described an overview of exemplary architecture involved its background, exemplary embodiments of the address and data arbiters will now be described.

Exemplary embodiments of the present invention provide an address arbiter which handles split bus transactions having ordered data bus cycles with respect to the address cycles. The exemplary arbiter described herein supports three bus masters (BM1, BM2 and BM3) which include a central processing unit BM1 and two special purpose bus masters BM2 and BM3. In addition to prioritizing requests from these bus masters, the address arbiter also handles two cases where the arbiter prevents any of the three bus masters from acquiring the address bus. The first case occurs when the cache controller 50 decides to invalidate an entry in the cache 40 or allocate data to the cache and the arbiter 60 takes the address bus away from all three bus masters and allows the cache controller 40 to drive the address bus to the data and tag cache SRAMs (not shown). This case allows the cache to be operated more efficiently by reducing the number of wait states associated with cache hits without using external latches to retain address information. For more information relating to this aspect of cache management, the interested reader is referred to U.S. patent application Ser. No. 08/430,450 to Farid Yazdy filed on an even date herewith and entitled "Address Tenure Control for Cache Management", which disclosure is incorporated here by reference.

The second case occurs when bus master BM1 starts a transaction to bus master BM2, where bus master BM2 is acting as a slave. For example, BM2 can interface another set of address and data buses (not shown in FIG. 3) via which BM1 wishes to begin a read or write operation. BM2 (acting as a slave) is designed, according to this exemplary embodiment, to immediately acknowledge transfer of the address on the address bus without regard to the availability of the data bus. Recall, however, that the exemplary system of FIG. 3 supports one level of pipelining. As described with respect to FIG. 2, one level of pipelining implies that an address driven on the address bus needs to remain on the address bus until the data cycle associated with that address has begun. Otherwise the address associated with that address is lost (unless latched) and the transaction will fail. Since BM2 acknowledges the address immediately regardless of whether an earlier transaction is still being processed, and to avoid failed transactions, the address arbiter deasserts all three bus grants and holds the masters off the address bus until BM2 (now acting as a slave) can start a data transaction. The slave BM2 is informed that the data on the data bus is associated with the address that it has already been acknowledged by a signal from the arbiter referred to as the "SSD_" signal. In this way, the address arbiter effectively delays the address acknowledge of BM2 until another bus master can safely be granted the address bus without a transaction failure.

An example of this feature of address arbiters according to the present invention will now be described with respect to FIG. 4 (A). In FIG. 4(A), as throughout the specification, an underscore attached to a signal name denotes active low. Therein, BM1 begins a first transaction with BM2 by asserting TS_. As mentioned above, BM2 immediately asserts the address acknowledge signal AACK_in the next clock cycle indicating that the address (denoted by the first elongated hexagon on the ADR signal line) has been transferred. Since no other bus masters are currently using the data bus, the arbiter 60 asserts the SSD_signal informing BM2 that the data on data bus is associated with the address cycle which it acknowledged. The address arbiter then transitions out of the idle state, allowing bus masters to again acquire the address bus, as described below in more detail with respect to FIG. 4(B).

Another cycle begins when BM1 asserts the second TS_signal shown in FIG. 4(A). Again, BM2 immediately acknowledges transfer of the address by asserting AACK_. Note, however, that arbiter 60 does not assert SSD_in the next clock cycle as it did for the first transaction. Instead, arbiter 60 waits until the data tenure associated with the first transaction ends (indicated by the rising edge of the first TA_signal) and holds off any other requesting bus masters until this time so that the address (denoted by the second elongated hexagon on the ADR line) associated with the second data cycle is not preempted by another bus master.

Another feature of this exemplary address arbiter is that it does not use the bus request signal from BM1 which saves a pin. Instead, the arbiter parks BM1 on the address bus until BM2 or BM3 request the address bus. Moreover, an arbitration loop (described in more detail below with respect to FIG. 4(B) ends in the BM1 state which, by default, grants the address bus to BM1 for at least one bus clock even if other bus masters are requesting the bus.

Address arbitration according to the present invention is implemented as a state machine. Starting from BM1 which is the default state, BM2 has higher priority than BM3 for the address bus if both are requesting the address bus at the same time. After BM2 and then BM3 have been granted the bus once, the bus is then granted to BM1. If BM1 does not need the bus and BM2 or BM3 are requesting the bus, then the arbiter loops around again and ends in the BM1 state. The state diagram of FIG. 4(B) illustrates the state transitions of this exemplary embodiment as a function of the arbitration control signals generated by the bus masters and the present state of the arbiter. The arbitration control signals and state transition triggers are summarized in the following table.

| TRAN-SITION LABEL | TRANSITION TRIGGER(S) | TRANSACTION RESULTS |
|---|---|---|
| A | (1) BM2 requests address bus; or (2) BM3 requests address bus; or (3) Cache controller starts tag invalidation cycle; or | Deassert bus grant to BM1. |
|  | (4) Cache controller starts allocation cycle; or (5) BM1 begins transaction with BM2 as slave. | Move to state Idle 1. |
| B | (1) Other requesting bus master(s) negate their bus request(s); and (2) Tag invalidation cycle not needed; and | Assert bus grant to BM1. |
|  | (3) Cache allocation cycle not needed; and (4) BM1 (master) - BM2 (slave) cycle already completed. | Return to state BM1. |
| C | (1) BM3 is requesting bus; and (2) BM2 is not requesting bus; and (3) The previous address cycle (if any) has already terminated; and | Assert bus grant to BM3. |
|  | (4) There is a pending address and data cycle waiting for the data tenure to end; and (5) Tag invalidation or allocation cycles are not needed; and (6) BM1 (master) - BM2 (slave) cycle (if any) already completed. | Move to state BM3. |
| D | (1) BM2 is requesting bus; and (2) Previous address cycle has terminated; and (3) Tag invalidation or cache allocation cycles are not needed; and | Assert bus grant to BM2. |
|  | (4) BM1 (master) - BM2 (slave) cycle (if any) already completed. | Move to state BM2. |
| E | (1) BM2 not requesting bus; or (2) BM2 address cycle in progress; or (3) Cache controller has decided to | Deassert BM2 bus grant. |
|  | perform a tag invalidation cycle or cache allocation cycle. | Move to state Idle 2. |
| F | (1) BM3 not requesting bus; and (2) BM2 address cycle (if any) completed and | Assert bus grant to BM1 |
|  | (3) Tag invalidation or cache allocation cycles not needed. | Move to state BM1. |
| G | (1) BM3 is request bus; and (2) Previous address cycle has been completed; and | Assert bus grant to BM3. |
|  | (3) Tag invalidation or cache allocation cycles not needed. | Move to state BM3. |
| H | (1) BM3 not requesting bus; or (3) BM3 address cycle in progress; or (3) Tag invalidation cycle is needed. | Deassert bus grant to BM3. |
|  |  | Move to state Idle 3. |
| I | (1) The previous address cycle has terminated; and (2) No tag invalidation cycle in | Assert bus grant to BM1. |
|  | progress. | Move to state BM1. |

Having described the operation of an exemplary address bus arbiter, data bus arbiters according to the present invention will now be discussed. A data bus arbiter according to exemplary embodiments of the present invention can operate independently of the address bus arbiter and can, for example, be implemented as a circular first-in, first-out (FIFO) buffer with two address pointers which each address one of four single bit elements in the FIFO. This exemplary data bus arbiter prioritizes requests from two potential data bus masters (BM1 and BM2). Bus master BM3 is not included in this exemplary data bus arbiter logic since it generates only address-only cycles which do not concern the data bus arbiter. The single bit FIFO elements can each be used to keep track of which (if any) of the two bus masters are currently using the data bus and which (if any) of the two bus masters are pipelined to receive the data bus grant next.

This tracking feature of exemplary data bus arbiters can operate as follows. A first pointer references a FIFO element containing a value indicative of which master currently owns the data bus, e.g., BM1=0 and BM2=1. The second pointer references a FIFO element used for storing a value identifying a subsequent (pipelined) data bus master. Each pointer can be implemented as a two bit counter (not shown) which address one of the four elements of the FIFO. The first pointer is incremented when the end of the data bus cycle is detected. This advances the first pointer to the address of the FIFO element associated with the next bus master to be granted the data bus. The second pointer is incremented when a new bus cycle is started when that new bus cycle is not an address-only cycle. The beginning, ending and type of cycle can be detected by the data arbiter by snooping the buses for the appropriate control signals.

When a new cycle is detected, the data bus arbiter state machine sets the value of the FIFO element pointed to by the second pointer to "1" if bus master BM2 asserted the signal starting the new cycle or "0" if bus master BM1 asserted that signal. Of course those skilled in the art will appreciate that the choice of a particular value for identifying each bus master being arbited can be varied to suit design considerations. The identification of the bus master responsible for starting the new cycle can be determined by looking at the most recent address bus grant. This information can be passed over a dedicated line to the data bus arbiter, or the data bus arbiter can snoop the address bus grant line of the arbitration bus 70. After setting the FIFO element value appropriately, the second pointer is then incremented.

The second pointer is decremented by one when the pending data bus cycle requested is address retried by the bus master, since this instruction terminates the pending data bus cycle. As can be seen from the foregoing, if the values of the two pointers are the same, this indicates that there is no pending bus master waiting for the data bus.

An example will serve to further the reader's understanding of data arbiters according to the present invention. FIG. 5 illustrates a timing diagram which will be used in this example. Therein, the timing signal TS_( wherein the underscore denotes active low) is used by the requesting bus master to indicate the start of a transaction. The AACK_ signal is used by the recipient of the transaction, for example, a memory controller, to indicate that the address placed on the address bus has been transferred. The ADDRESS BUS timing signal provides an indication of he tenure of an address on the address bus. The TA_control signal provides an indication that the data placed on the data bus has been transferred. Lastly, the DATA BUS timing signal provides an indication of the data tenure of a transaction on the data bus.

Various times of interest during the transactions illustrated in FIG. 5 have been identified by the dotted lines thereon.

The state of the data bus arbiter, i.e., the values of the FIFO elements and the positions of the pointers, is described below for each of times T0-T6 as illustrated in FIGS. 6(a)-6(g), respectively. At time T0, the circular FIFO 62 is initialized such that each of its four one bit storage elements 64-70 contain a logical 0 and the two pointers PNT1 and PNT2 are set to the address of the first element 64.

Time T1 has been selected as the beginning of a new transaction initiated by bus master BM1. Since no bus master is currently using or waiting to use the data bus, the data bus arbiter grants the data bus to bus master BM1. At this time, the content of FIFO element 64 is set to 0 to indicate that the current data bus master is BM1. At the same time, the second pointer PNT2 is incremented to the address of FIFO element 66. Thus, FIG. 6(b) illustrates that the current bus master is BM1 and there is not currently a pipelined bus master awaiting the data bus.

Time T2 is taken at a point when bus master BM2 requests the address and data buses. At this time, bus master BM1 still has control of the data bus as seen by the first elongated hexagon on the DATA BUS signal line in FIG. 5. Although bus master BM2 can acquire the address bus (note the second elongated hexagon on the ADDRESS BUS signal line), the request for the data bus must await completion of the earlier transaction by bus master BM1. The content of FIFO element 66 is now set to logical 1 as illustrated by FIG. 6(c) to indicate that the next requesting bus master is BM2. Pointer PNT2 is incremented to the address of FIFO element 68.

At time T3, the end of the data tenure associated with the first address cycle by bus master BM1 is detected at the end of the last TA_signal. (The first cycle illustrated in FIG. 5 is a burst operation, having four separate data bus transactions.) Since BM1 is no longer the current data bus master, pointer PNT1 is incremented to FIFO element 66 and the data bus arbiter 60 grants the data bus to bus master BM2 based upon the logical 1 stored in FIFO element 66. Note that pointer PNT2 still points at FIFO element 68 at time T3 since no new transaction has begun.

A new transaction does begin, however, at time T4 when bus master BM2 again requests the address and data buses. This cycle is also pipelined pending the completion of the earlier BM2 cycle. At this time, the content of FIFO element 68 is set to logical 1 to indicate that the requesting bus master is BM2 and PNT2 is incremented to the address of FIFO element 70 as shown in FIG. 6(e).

Time T5 marks the end of the data tenure associated with the first BM2 cycle which began at time T2. At this time, the first pointer PNT1 is incremented to the address of FIFO element 68. This indicates that the data bus arbiter 60 should now grant the data bus to bus master BM2 since the value stored in FIFO element 68 is a logical 1 as seen in FIG. 6(f). Time T6 identifies the end of the data tenure associated with the second BM2 cycle. At this time, pointer PNT1 is incremented to the address of FIFO element 70. Since there are no more pending cycles, the values of the two pointers are equal and the data bus arbiter awaits additional bus requests.

While this exemplary embodiment of a data arbiter tracks only two bus masters which compete for the data bus, those skilled in the art will appreciate that this embodiment could be extended to track three or more potential data bus masters by using, for example, multi-bit FIFO elements. Moreover, although only one level of pipelining is illustrated herein, additional levels of pipelining could be supported by providing additional pointers and FIFO elements.

The above-described exemplary embodiments are intended to be illustrative in all respects, rather than restrictive, of the present invention. Thus, it will be apparent from the foregoing that while address bus arbiters and data bus arbiters according to the present invention can be used together, they also can be used independently of one another. For example, address bus arbiters according to the present invention can be used without a separate data bus arbiter where pipelining support is not needed. Similarly, the data bus arbiter can be used in conjunction with any type of address bus arbiter, such as an address arbiter implementing the ordered list type protocol described above, to support pipelined transactions. Thus the present invention is capable of many variations in detailed implementation that can be derived from the description contained herein by a person skilled in the art. All such variations and modifications are considered to be within the scope and spirit of the present invention as defined by the following claims.

What I claim is:

1. A data bus arbiter for granting a data bus to one of a plurality of bus masters at a time, separately of an address bus associated therewith, comprising:

logic for detecting the beginning of a bus cycle;

logic for determining whether said detected bus cycle includes a request to use said data bus;

logic for granting said data bus, in association with said logic for determining, to a first one of said plurality of bus masters which requests use of said data bus;

a storage device for storing an identity of said first one of said plurality of bus masters, and for also storing an identity of at least a second one of said plurality of bus masters to be granted said data bus next, wherein said logic for granting grants said data bus to said second one of said plurality of bus masters after said first one of said plurality of bus masters has completed its data cycle;

wherein said logic for granting comprises a plurality of pointers which store addresses associated with said identities of said first and second bus masters; and wherein said logic for granting increments one of said plurality of pointers in response to the detection of a start of a bus cycle which includes a request to use of said data bus.

2. The data bus arbiter of claim 1, wherein said storage device is a circular FIFO and said stored identities are individually stored in a respective element of said circular FIFO.

3. The data bus arbiter of claim 1, wherein said pointers comprise counters.

4. The data bus arbiter of claim 1, wherein said logic for granting increments another of said plurality of pointers after said data cycle associated with said first one of said plurality of bus masters is completed and generates a data bus grant signal to said second one of said plurality of bus masters using a value stored in a storage element identifying said second one of said plurality of bus masters.

5. The data bus arbiter of claim 1, wherein said logic for granting stores a value indicative of a third one of said plurality of bus masters to be granted said data bus after said second one of said plurality of bus master completes its data cycle.

6. The data bus arbiter of claim 5, wherein said first, second and third ones of said plurality of bus masters can be the same bus master.

7. The data bus arbiter of claim 1, wherein said logic for granting does not advance said pointer when said bus cycle is an address-only bus cycle.

8. A method for arbiting a data bus independently of an address bus associated therewith, comprising the steps of:
- receiving an indication of an address bus grant to one of a plurality of bus masters;
- granting, if said data bus is currently idle, said data bus to said one of said plurality of bus masters;
- storing, if said data bus is currently busy, an identifier of said one of said plurality of bus masters using a FIFO storage device; and
- later granting said data bus, if said data bus is currently busy, to said one of said plurality of bus masters using said stored identifier;
- wherein said FIFO storage device includes a plurality of storage locations, and further includes associated therewith at least first and second pointers for addressing said storage locations, wherein said method further comprises the steps of:
- incrementing said first pointer when a bus master completes its use of said data bus;
- incrementing said second pointer when a new bus cycle is started which includes a request to access to said data bus.

9. The method for arbiting a data bus of claim 7, wherein said second pointer is not advanced when said new bus cycle is an address-only bus cycle.

* * * * *